(12) United States Patent
Tang et al.

(10) Patent No.: US 9,004,474 B2
(45) Date of Patent: Apr. 14, 2015

(54) FIXING DEVICE

(75) Inventors: Zi-Ming Tang, Shenzhen (CN);
Ming-Fu Luo, Shenzhen (CN);
Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 770 days.

(21) Appl. No.: 13/246,976

(22) Filed: Sep. 28, 2011

(65) Prior Publication Data
US 2012/0299234 A1    Nov. 29, 2012

(30) Foreign Application Priority Data

May 27, 2011  (CN) .......................... 201110140302.5

(51) Int. Cl.
*B25B 5/06* (2006.01)
*B23Q 3/00* (2006.01)
*B23Q 3/06* (2006.01)

(52) U.S. Cl.
CPC ...................................... *B23Q 3/06* (2013.01)

(58) Field of Classification Search
USPC ............. 269/134, 266, 20, 238, 58, 309, 221, 269/289 R, 60, 55, 313, 314, 302.1, 254 R
See application file for complete search history.

(56) References Cited

U.S. PATENT DOCUMENTS 5,342,031 A * 8/1994 Yu-Fang ........................ 269/134

FOREIGN PATENT DOCUMENTS

| JP | 08-130289 A | 5/1996 |
| JP | 3448372 B2 | 7/2003 |
| TW | 200635477 | 10/2006 |
| WO | WO 2006/068240 A1 | 6/2006 |

* cited by examiner

*Primary Examiner* — Lee D Wilson
*Assistant Examiner* — Seahee Yoon
(74) *Attorney, Agent, or Firm* — Novak Druce Connolly Bove + Quigg LLP

(57) ABSTRACT

A fixing device for fixing a workpiece includes a base, a first pressing block pressing the workpiece to the base, a second pressing block, a first support member, a second support member, and a side pressing block. The workpiece includes a preprocessing portion to be machined, which has an inner surface and an outer surface, the inner and outer surfaces of the preprocessing portion are sandwiched between non-rigid materials during a machining process to avoid the generating of swarfs.

19 Claims, 5 Drawing Sheets

FIXING DEVICE

BACKGROUND

1. Technical Field

The present disclosure generally relates to fixing devices, and particularly to a fixing device used for fixing a workpiece.

2. Description of Related Art

Generally, before cutting or milling a workpiece, the workpiece should be fixed onto a fixing device. The cutting or milling process of the workpiece inevitably generates small swarfs as the workpiece is being cut or milled. Thus, an extra deburring process is generally applied to the workpiece to reduce or remove the swarfs formed on the cutting or milling surfaces of the workpiece, thereby increasing the production costs, and lowering the production efficiency.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
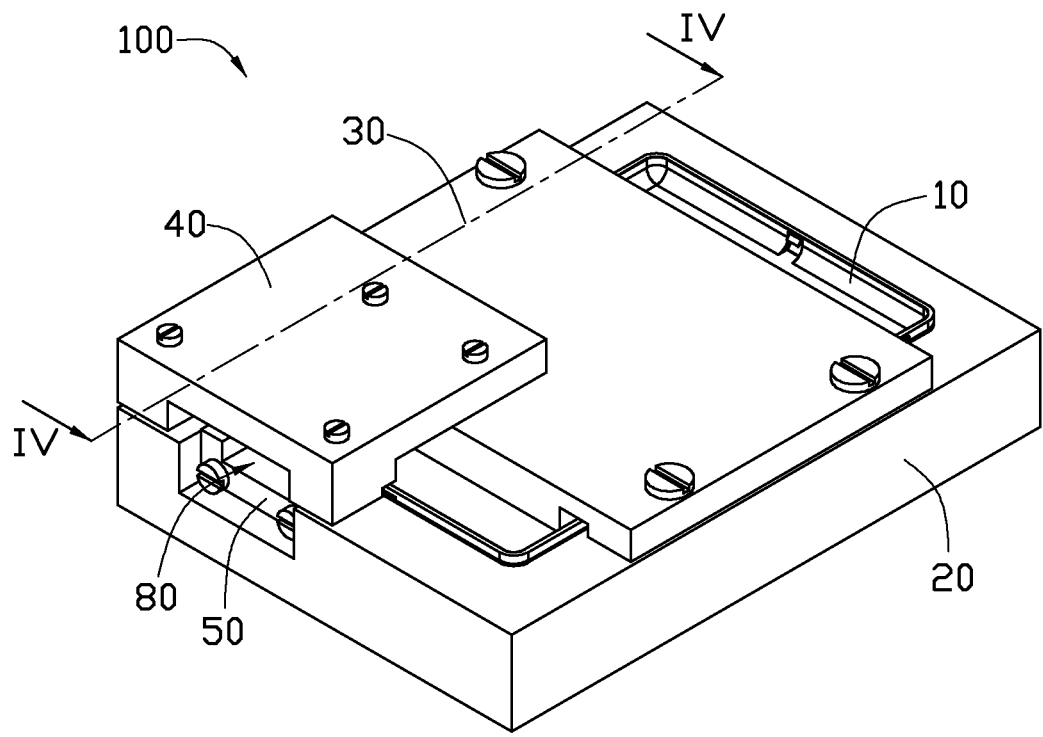
FIG. 1 shows an isometric view of an embodiment of an assembled fixing device, with a workpiece fixed thereon.
Figure 2:
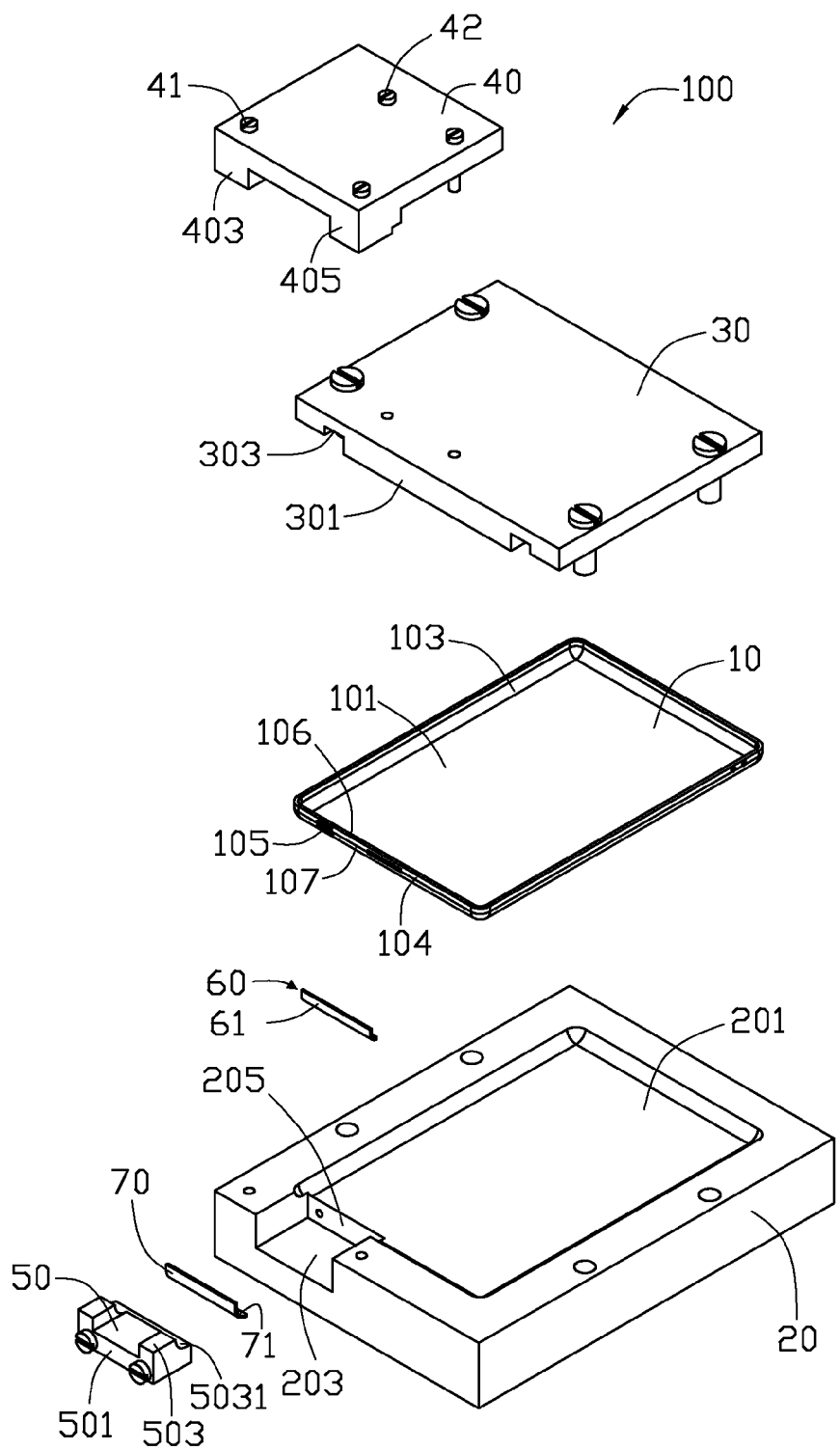
FIG. 2 shows an exploded, isometric view of the fixing device together with the workpiece.

Referring to FIGS. 1 and 2, an embodiment of a fixing device 100 for fixing a workpiece 10 during a cutting or milling process is shown. The fixing device 100 includes a base 20, a first pressing block 30, a second pressing block 40, a side pressing block 50, a first support member 60 and a second support member 70.

The workpiece 10 includes a substantially rectangular bottom plate 101, two first side walls 103 extending from a plurality of opposite side edges of the bottom plate 101, and two second side walls 104. A preprocessing portion 105 is formed on at least one of the side walls 103 and 104. In the illustrated embodiment, the preprocessing portion 105 is formed on the second side wall 104 of the workpiece 10 and includes an inner surface 106 and an outer surface 107. The inner surface 106 and the outer surface 107 are both curved. The preprocessing portion 105 may be on any other portion on the workpiece 10 and the preprocessing portion 105 itself may be flat, regular, or irregular in cross section of a structural shape.

The base 20 is a substantially rectangular board, and includes a receiving chamber 201 recessed from the top surface of the base 20 for receiving the workpiece 10. A mounting slot 203 is defined in the top surface of the base 20 and positioned adjacent to the receiving chamber 201. The depth of the mounting slot 203 is larger than that of the receiving chamber 201, thereby forming a stepped mounting surface 205 located between the receiving chamber 201 and the mounting slot 203, thus allowing a certain depth of open space immediately underneath the preprocessing portion 105 of the workpiece 10.

The first pressing block 30 is detachably mounted on the base 20 for pressing and holding the workpiece 10 within the receiving chamber 201 of the base 20. A pressing protrusion 301 is formed on the bottom surface of the first pressing block 30, for pressing against the bottom plate 101 of the workpiece 10. Two receiving slots 303 are recessed into the bottom surface of the first pressing block 30, and positioned at two sides of the pressing protrusion 301, to correspond with the two first side walls 103 of the workpiece 10.

Figure 4:
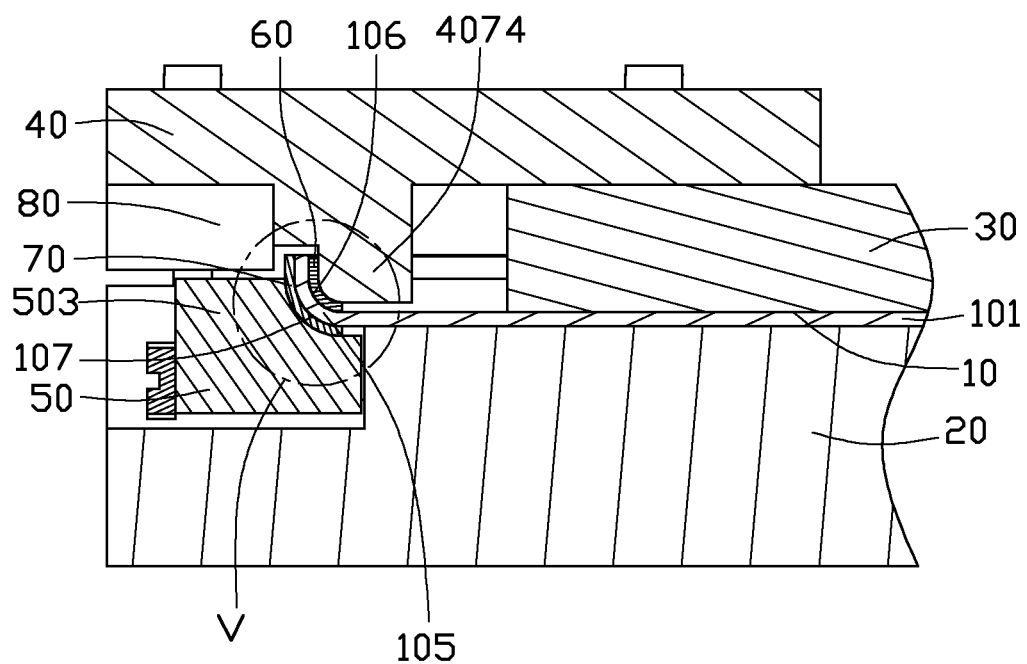
FIG. 4 shows a partial cross-section of the fixing device together with the workpiece, taken along line IV-IV of FIG. 1.
Figure 5:
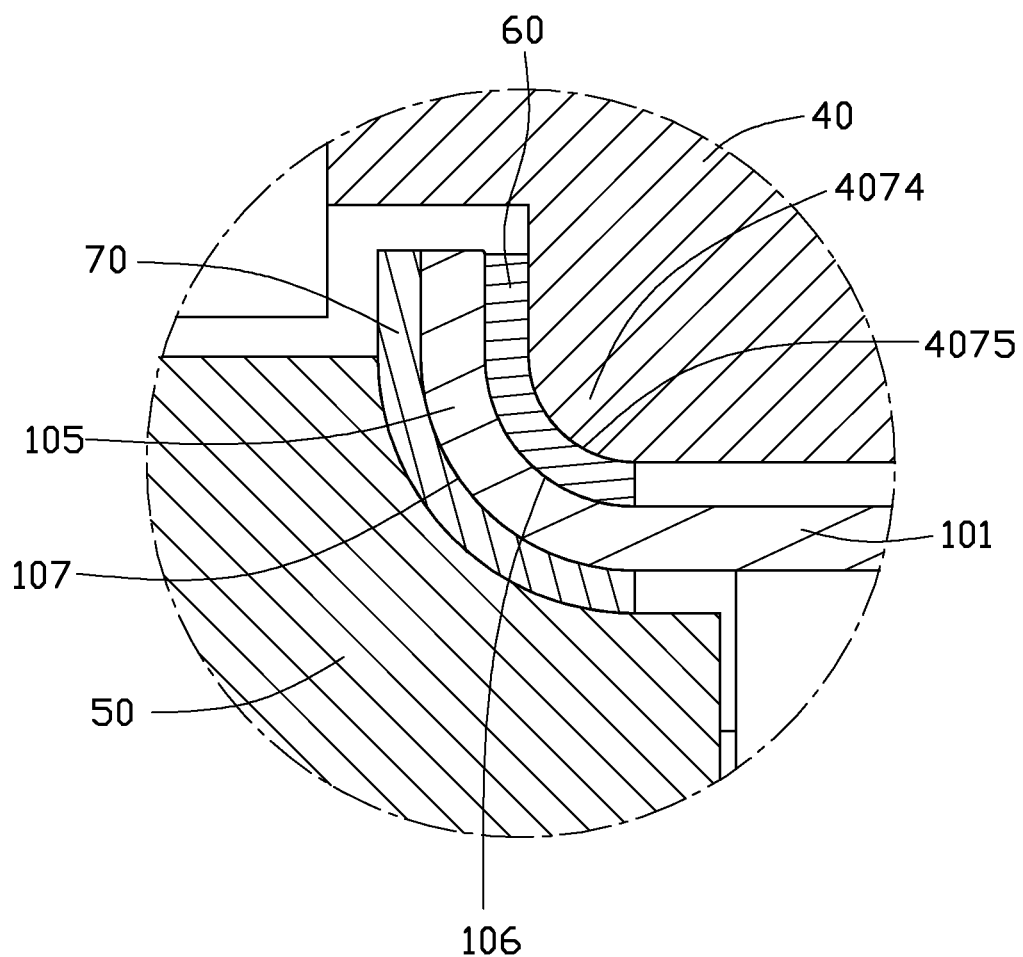
FIG. 5 shows an enlarged view of section V of FIG. 4.

Referring to FIGS. 2, 4 and 5, the first support member 60 is substantially the same shape in cross section as the inner surface 106 of the preprocessing portion 105 of the workpiece 10. The first support member 60 is positioned adjacent to and provides resistance against the inner surface 106 of the preprocessing portion 105 of the workpiece 10. In the illustrated embodiment, the first support member 60 has a curved surface 61 (as shown in FIG. 2). The curved surface 61 can be positioned adjacent to and resist against the inner surface 106 of the preprocessing portion 105 of the workpiece 10 in an operation.

Figure 3:
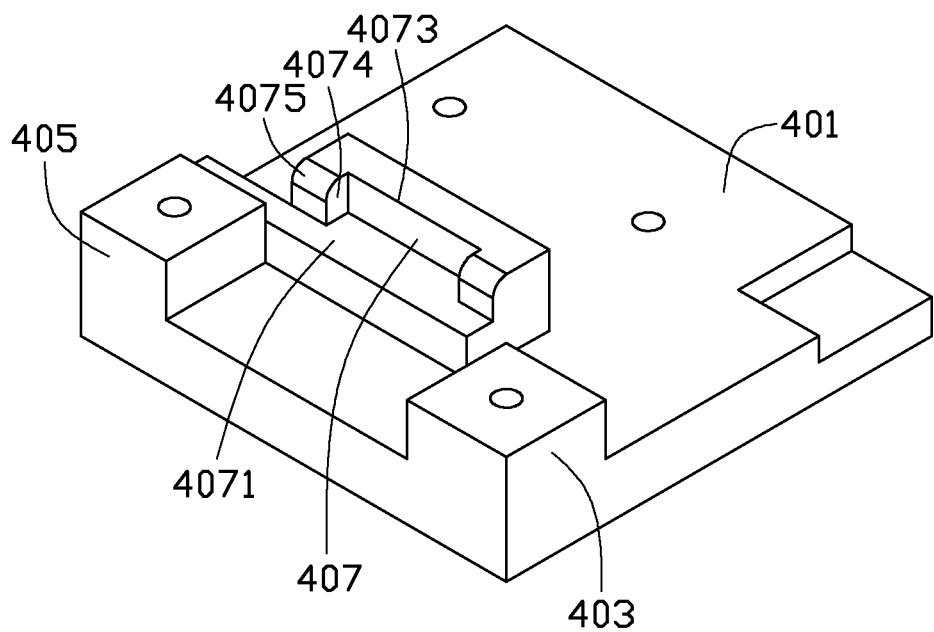
FIG. 3 shows an isometric view of a second pressing block of the fixing device of FIG. 1.

Also referring to FIG. 3, the second pressing block 40 is mounted to the base 20 to hold and resist against the first support member 60. The second pressing block 40 is positioned upon the mounting slot 203 of the base 20 and further connected with the first pressing block 30. The second pressing block 40 includes a substantially rectangular main body 401, a first lug boss 403, a second lug boss 405 and a pressing structure 407. The first lug boss 403 together with the second lug boss 405 are configured on two adjacent corners of the main body 401. The distance between the first lug boss 403 and the second lug boss 405 is substantially the same as the width of the mounting slot 203 of the base 20. The pressing structure 407 is formed on the underside of the main body 401 and connected with the second lug boss 405. The pressing structure 407 includes a bottom body 4071 formed on the main body 401 with one end thereof connecting with the second lug boss 405, and a side body 4073. The side body 4073 is in the shape of a bar formed on the bottom body 4071 and positioned adjacent to and facing toward the gap between the first and second lug bosses 403, 405. Two pressing bodies 4074 are formed on the two ends of the side body 4073. In the illustrated embodiment, each of the two pressing bodies 4074 defines a pressing surface 4075 facing toward the side of the first and second lug bosses 403, 405, for mating with the first support member 60.

The second support member 70 is mounted within the mounting slot 203 of the base 20 and positioned opposite to the first support member 60 to cooperatively hold the preprocessing portion 105 of the workpiece 10 in place. In the illustrated embodiment, the second support member 70 has a cross-sectional shape substantially the same as that of the first support member 60. The second support member 70 has a shape configured to match and mate with the outer surface 107 of the preprocessing portion 105 of the workpiece 10, and is configured for providing a resistance against the outer surface 107 of the preprocessing portion 105 of the workpiece 10 during machining. The second support member 70 has a curved surface 71 (as shown in FIG. 2). The curved surface 71 of the second support member 70 can wrap the outer surface 107 of the preprocessing portion 105 of the workpiece 10 for providing a resistance against the preprocessing portion 105. The second support member 70 and the first support member 60 are both made of non-rigid material such as acrylonitrile butadiene styrene or rubber material.

Also referring to FIG. 2, the side pressing block 50 is assembled within the mounting slot 203 of the base 20 together with the second support member 70. The side pressing block 50 resists against the corresponding second support member 70 for keeping the second support member 70 resisting against the outer surface 107 of the preprocessing portion 105 of the workpiece 10. The side pressing block 50 includes a main portion 501 and two resisting portions 503 formed on the two ends of the main portion 501. Each resisting portion 503 defines a resisting surface 5031 toward one side of the main portion 501 corresponding to the profile of the outer surface of the second support member 70. In the illustrated embodiment, the resisting surface 5031 is also curved. As the side pressing block 50 is assembled into the mounting slot 203 of the base 20, the two resisting portions 503 of the side pressing block 50, the main body 401, the first lug boss 403 and the second lug boss 405 of the second pressing block 40 cooperatively define a cutter entrance 80 which will allow the entry of a cutting head to machine the preprocessing portion 105 of the workpiece 10.

Referring to FIGS. 1 through 5, when fixing the workpiece 10 to the fixing device 100 during the cutting or milling process, the workpiece 10 is first placed into the receiving chamber 201 of the base 20, and the preprocessing portion 105 of the workpiece 10 is positioned toward the mounting slot 203 of the base 20. Then, the first pressing block 30 is mounted on the base 20, to secure the bottom plate 101 of the workpiece 10. The two first side walls 103 of the workpiece 10 are respectively received into the corresponding two receiving slots 303 of the first pressing block 30. Then the first support member 60 is positioned against the inner surface 106 of the preprocessing portion 105 of the workpiece 10 and the second pressing block 40 is mounted to the base 20 via two screws 41 and connected with the first pressing block 30 by means of two screws 42. The two pressing bodies 4074 both resist against the corresponding first support member 60 to keep the first support member 60 tightly pressed against the inner surface 106 of the preprocessing portion 105 of the workpiece 10. Then the second support member 70 is assembled into the mounting slot 203 of the base 20 to be tightly pressed against the outer surface 107 of the preprocessing portion 105 of the workpiece 10. The side pressing block 50 is finally assembled into the mounting slot 203 of the base 20 with one end thereof resisting against the corresponding second support member 70, thus, the workpiece 10 is fixed to the fixing device 100 and is ready to be machined.

When machining the preprocessing portion 105 of the workpiece 10, the fixing device 100 is fixed to a machine tool (not shown), a cutter (not shown) is inserted into the cutter entrance 80 formed by the two resisting portions 503 of the side pressing block 50, the main body 401, the first lug boss 403 and the second lug boss 405 of the second pressing block 40 to machine the preprocessing portion 105 of the workpiece 10. Since the first and second support members 60, 70 are both made of soft material, and the inner surface 106 and the outer surface 107 of the preprocessing portion 105 of the workpiece 10 are resisted against by the first support member 60 and the second support member 70, respectively, the swarfs generated during the machining process are absorbed by the first and second support members 60, 70. Thus, after the preprocessing portion 105 of the workpiece 10 is processed, it is only necessary to detach the first and second support members 60, 70 from the fixing device 100, to remove the swarfs. Therefore, it efficiently avoids the swarfs from forming on the inner and outer surfaces 106, 107 of the workpiece 10.

It is to be understood that the side pressing block 50 can also be integrally formed within the mounting slot 203 of the base 20.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A fixing device for fixing a workpiece, the workpiece having a preprocessing portion, the fixing device comprising:
   a base configured for placing the workpiece;
   a first pressing block detachably mounted on the base for pressing and holding the workpiece;
   a first support member having a curved surface, the curved surface configured for being positioned adjacent to and resisting against an inner surface of the preprocessing portion of the workpiece;
   a second pressing block mounted to the base to hold and resist against the first support member;
   a second support member configured for being positioned adjacent to and resists against an outer surface of the preprocessing portion of the workpiece, and the outer surface of the preprocessing portion of the workpiece being opposite to the inner surface of the preprocessing portion of the workpiece; and
   a side pressing block assembled to the base and resisting against the second support member;
   wherein, the second pressing block and the side pressing block cooperatively define a cutter entrance configured for facilitating a cutter to enter the cutter entrance to machine the preprocessing portion of the workpiece.

2. The fixing device of claim 1, wherein the second pressing block comprises a main body, two lug bosses and a pressing structure; the two lug bosses are separately formed on the main body; the side pressing block is positioned under the second pressing block; the main body, the two lug bosses of the second pressing block, and the side pressing block cooperatively define the cutter entrance; the pressing structure is formed on the main body and tightly resists against the first support member.

3. The fixing device of claim 2, wherein the pressing structure comprises a bottom body formed on the main body with one end thereof connecting with one of the two lug bosses, and a side body formed on the bottom body and two pressing bodies oppositely formed on two ends of the side body; each of the two pressing bodies defines a pressing surface facing toward the two lug bosses side, for resisting against the corresponding first support member.

4. The fixing device of claim 2, wherein the side pressing block comprises a main portion and two resisting portions oppositely formed on two ends of the main portion, each resisting portion defines a resisting surface toward one side of the main portion corresponding to the second support member.

5. The fixing device of claim 4, wherein the resisting surface is curved.

6. The fixing device of claim 4, wherein the base comprises a receiving chamber recessed from a top surface of the base for receiving the corresponding workpiece, and a mounting slot defined adjacent to the receiving chamber; the preprocessing portion of the workpiece is positioned toward the mounting slot of the base; the second pressing block is positioned upon the mounting slot of the base and further connects with the first pressing block; the side pressing block is assembled within the mounting slot of the base together with the second support member.

7. The fixing device of claim 6, wherein the mounting slot has a depth larger than that of the receiving chamber, thereby forming a stepped mounting surface between the receiving chamber and the mounting slot, corresponding to the preprocessing portion of the workpiece; one end of the side pressing block resists against the mounting surface.

8. The fixing device of claim 7, wherein the first pressing block comprise a pressing protrusion formed on a bottom surface of the first pressing block, for pressing the workpiece.

9. The fixing device of claim 8, wherein the first pressing block further comprises two receiving slots oppositely recessed into the bottom surface of the first pressing block and positioned at two sides of the pressing protrusion.

10. The fixing device of claim 1, wherein the first support member and the second support member are both substantially sheet shaped and made of soft material.

11. A fixing device for fixing a workpiece, the workpiece having a preprocessing portion, the fixing device comprising:
a base defining a receiving chamber configured for placing the workpiece
a side pressing block formed aside of the receiving chamber;
a first pressing block detachably mounted on the base for pressing and holding the workpiece within the receiving chamber;
a first support member configured for being positioned adjacent to and resists against an inner surface of the preprocessing portion of the workpiece;
a second pressing block mounted on the base to hold and resist against the first support member;
a second support member configured for being assembled to the side pressing block of the base and resists against an outer surface of the preprocessing portion of the workpiece;
wherein, the second pressing block and the side pressing block cooperatively define a cutter entrance configured for facilitating a cutter to enter the cutter entrance to machine the preprocessing portion of the workpiece.

12. The fixing device of claim 11, wherein the first support member and the second support member are both substantially sheet shaped and made of soft material; the base further comprises a mounting slot defined adjacent to the receiving chamber; the preprocessing portion of the workpiece is positioned toward the mounting slot of the base; the second pressing block is positioned upon the mounting slot of the base; the second support member is assembled within the mounting slot of the base.

13. The fixing device of claim 12, wherein the first pressing block comprises a pressing protrusion formed on a bottom surface of the first pressing block, for pressing the workpiece.

14. The fixing device of claim 13, wherein the first pressing block further comprises two receiving slots oppositely recessed into the bottom surface of the first pressing block and positioned at two sides of the pressing protrusion.

15. The fixing device of claim 13 wherein the second pressing block comprises a main body, two lug bosses and a pressing structure; the two lug bosses are separately formed on the main body; the side pressing block is positioned under the second pressing block; the main body, the two lug bosses of the second pressing block, and the side pressing block cooperatively define the cutter entrance; the pressing structure is formed on the main body and tightly resists against the first support member.

16. The fixing device of claim 15, wherein the pressing structure comprises a bottom body formed on the main body with one end thereof connecting with one of the two lug bosses, and a side body formed on the bottom body and two pressing bodies oppositely formed on two ends of the side body; the two pressing bodies each defines a pressing surface facing toward the two lug bosses side, for resisting against the corresponding first support member.

17. The fixing device of claim 15, wherein the side pressing block comprises a main portion and two resisting portions oppositely formed on two ends of the main portion, each resisting portion defines a resisting surface toward one side of the main portion corresponding to the second support member.

18. The fixing device of claim 17, wherein the resisting surface is curved.

19. A fixing device for fixing a workpiece, the workpiece having a preprocessing portion, the preprocessing portion having an inner surface and an outer surface opposite to the inner surface, the outer surface being curved, the fixing device comprising:
a base configured for placing the workpiece;
a first pressing block detachably mounted on the base for pressing and holding the workpiece;
a first support member configured to resist against the inner surface of the preprocessing portion of the workpiece;
a second pressing block mounted to the base to hold and resist against the first support member;
a second support member having a curved surface, the curved surface configured to wrap the outer surface of the preprocessing portion of the workpiece for providing a resistance against the preprocessing portion; and
a side pressing block assembled to the base and resisting against the second support member;
wherein, the second pressing block and the side pressing block cooperatively define a cutter entrance configured for facilitating a cutter configured entering to machine the preprocessing portion of the workpiece, and the preprocessing portion will be clamped between the first support member and the second support member in an operation.

* * * * *